US006415657B1

(12) United States Patent
Bortolin et al.

(10) Patent No.: US 6,415,657 B1
(45) Date of Patent: Jul. 9, 2002

(54) SWITCH MONITORING SYSTEM

(75) Inventors: Dino Bortolin, LaSalle (CA); Timothy P Philippart, Royal Oak, MI (US); Mikhail Zarkhin, West Bloomfield, MI (US); Robert G Rudzewicz, Troy, MI (US); Vasil Germanski, Washington, MI (US); Mark J Stachew, Fenton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 24 days.

(21) Appl. No.: 09/659,177

(22) Filed: Sep. 11, 2000

(51) Int. Cl.[7] .............................................. G01M 15/00

(52) U.S. Cl. ...................................... 73/118.1; 324/378

(58) Field of Search ............................... 73/116, 117.2, 73/117.3, 118.1, 119 R; 324/378, 380

(56) References Cited

U.S. PATENT DOCUMENTS

| | | | |
|---|---|---|---|
| 4,220,818 A | | 9/1980 | Kahn |
| 4,768,480 A | | 9/1988 | Grenn et al. |
| 4,984,543 A | | 1/1991 | Tharman |
| 5,080,078 A | | 1/1992 | Hamburg |
| 5,187,337 A | | 2/1993 | Fujie et al. |
| 5,388,467 A | * | 2/1995 | Jereb et al. |
| 5,765,535 A | | 6/1998 | Radermacher |
| 6,211,577 B1 | * | 4/2001 | Alksnat et al. |
| 6,211,701 B1 | * | 4/2001 | Kuijk et al. |
| 6,275,017 B1 | * | 8/2001 | Germanski et al. |

* cited by examiner

*Primary Examiner*—Eric S. McCall
(74) *Attorney, Agent, or Firm*—Edwin W. Bacon, Jr.

(57) ABSTRACT

A switch monitoring system for measuring closure time of a switch in a vehicle when the vehicle ignition switch is off. The switch monitoring system includes an application specific integrated circuit, a low powered stand-by voltage source, and external interface circuitry connected to the switch, The switch monitoring system uses very little current to operate the time base and switches off completely after switch closure has been captured, thus preventing excessive battery drain. The microprocessor software can obtain the time to closure at the next vehicle power-up sequence.

7 Claims, 2 Drawing Sheets

SWITCH MONITORING SYSTEM

BACKGROUND OF THE INVENTION

The present invention relates generally to switch closure time in a vehicle, and more particularly, to an apparatus for measuring the closure time of a switch in a vehicle when the ignition switch of the vehicle is off.

There is a need in the automotive industry to measure the amount of time needed for switch closure when a vehicle ignition switch is turned off or the engine is not running. There must be very low current draw from the switch monitoring system to prevent excessive battery draw. Current draw must be within the ignition off current draw requirement of the vehicle. Switch cleansing current requirements to maintain contact integrity must also be satisfied. The monitoring must withstand the automotive voltage range of 6–24 volts on the battery line. The vehicular main power supply and the particular microprocessor of the vehicular control module cannot run for long periods of time after the ignition is off, otherwise the car's battery would drain. There is a need to monitor this time for a period of six weeks.

Conventional methods in the auto industry for monitoring switch closure whether by mechanical or electronic means have had calibration concerns and excessive current draw on the existing battery of the vehicle. For example, there is a need in the automotive industry to determine whether the fuel system leaks. The closure time of a pressure switch which resides in the fuel system of the vehicle is thus monitored. However, autocalibration is not possible with present methods of closure time determination without excessive battery drain. Accordingly, there is a need for switch closure time monitoring with very little current drain to operate the time base and which switches off completely after the switch closure time has been captured.

SUMMARY OF THE INVENTION

A switch monitoring system that measures the closure time of a switch in a vehicle when the vehicle's ignition switch is off. The switch monitoring system includes an oscillator circuit as a pan of an application specific integrated circuit (ASIC). It provides a reference signal that is divided down to a nominal 1/60 Hz waveform, and then used as the clock source for a 16 bit counter. The counter is a portion of the vehicle shut down timer system which monitors an external switch and captures data for a microprocessor module of the particular vehicle system in question. The switch monitoring system is powered by a low power stand-by voltage source to provide very low current draw thus preventing excessive battery drain.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENTS

The following description of the present invention is merely exemplary in nature and is in no way intended to limit the invention or its uses. Moreover, the following description, is for the sake of example only, and the scope and spirit of the invention ought to be construed by appropriate interpretation of the appended claims.

Figure 1:
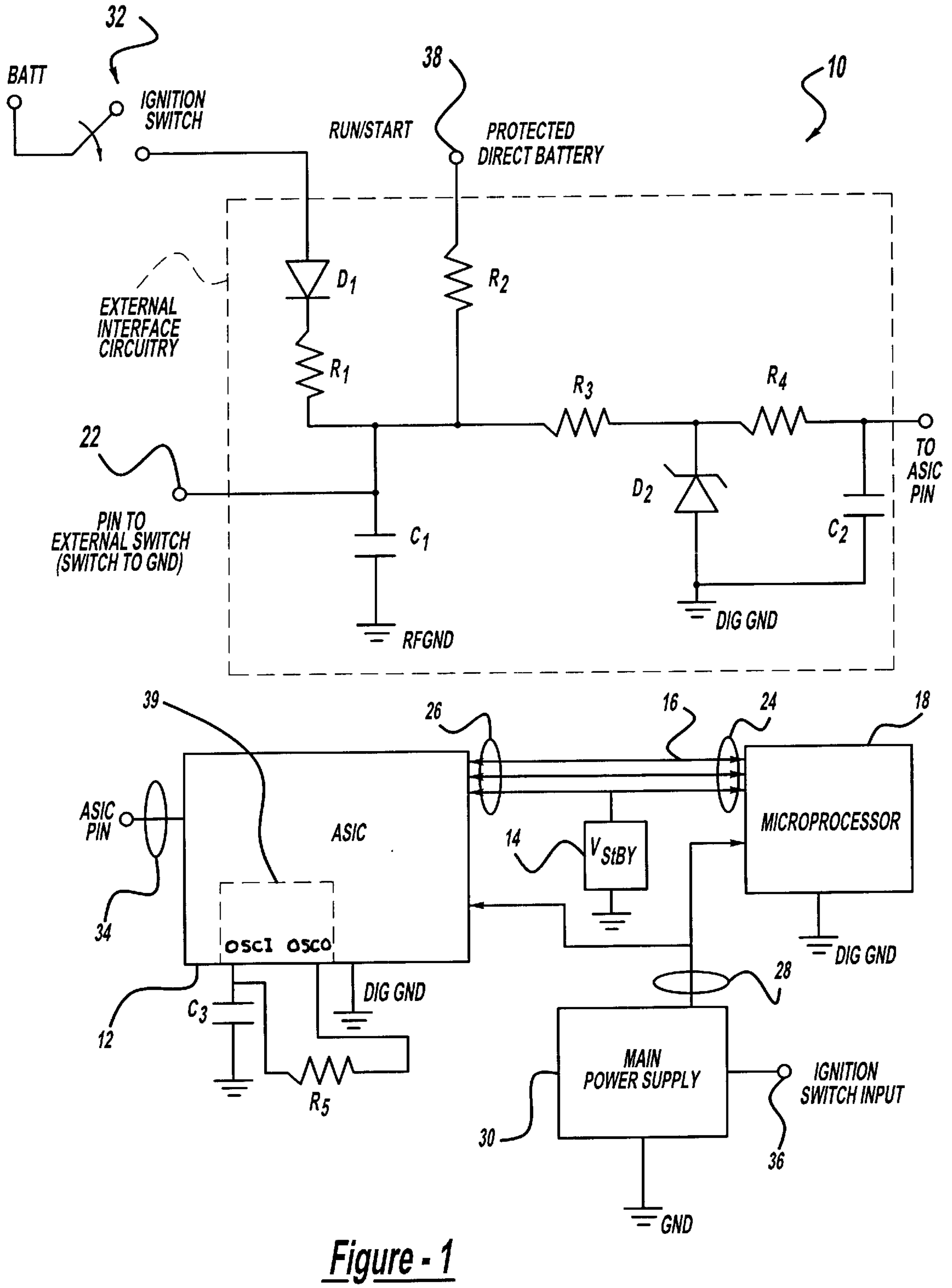
FIG. 1 is a diagram of a switch monitoring system according to the preferred embodiment of the present invention.

FIG. 1. illustrates a switch monitoring system 10 for a vehicular natural vapor leak detection switch (not shown). An application specific integrated circuit (ASIC) 12 contains the oscillator circuit which drives the time measurement. The data bus 16 to the microprocessor is not used during monitoring, only after the fact to read information captured by the ASIC. Keeping the microprocessor operating during monitoring would drain the battery. The oscillator circuit, FIG. 2, and several external components provide a reference signal that is divided down to a nominal 1/60 Hz waveform and then used as a clock source for a 16 bit counter (44). The ASIC 12 also monitors the state of a switched input pin 22 of the natural vapor leak detect switch (not shown), and capture its transition time. A first interface 24 interconnects ASIC 12 to the microprocessor 18. A second interface 26 couples the ASIC to the voltage stand-by (Vstby) 14 which is a low current linear regulator used to power the relevant portion of the ASIC 12. A third interface 28 couples the ASIC 12 to the main power supply 30 of the vehicle which in turn is coupled to the ignition switch 32 of the vehicle. Respective constituent parts of the switch monitoring system are detailed briefly below.

Cleansing Current

Cleansing current for switch contact integrity is provided when the ignition switch 32 is on.

$$I\ CLEANSING = \frac{V\ PROTECTED\ DIRECT\ BATTERY}{R_2} + \frac{V\ BATTERY - VD1}{R_1}$$

R2>>R1, so majority of cleansing current is thru R1, which is only present when ignition switch is on.

$$I_{CLEANSING} \approx \frac{V_{BATTERY} - V_{D1}}{R_1}$$

$R_2$ is high resistance, to minimize battery drain when the switch is off.

$D_1$ prevents backfeeding to the ignition switch node 36 from protected direct battery 38.

Vstandby (Vstby) 14 is a low current linear regulator used to power microprocessor "battery backed" RAM, i.e. keep alive memory and to power the oscillator and switch monitoring circuits in the ASIC 12.

R3 and D2 are used as a current limiting voltage clamp to prevent the switch pullup resistance form pulling up the voltage of Vstby 14, above the specified limit.

R4 and C2 form a lowpass filter to debounce the monitored switch. R4 also limits the amount of current dumped into the Vstby node.

| | | |
|---|---|---|
| $D_1$ | = | small signal diode |
| $R_2$ | = | 100 kΩ |
| $R_2$ | = | 4.7 kΩ |
| $R_3$ | = | 10 k |
| $R_4$ | = | 20 k |
| $D_3$ | = | 5.6 V Zener |
| $C_1$ | = | 1000 pF |
| $C_2$ | = | 0.022 μF |

Switch detection does not require the module's main power supply 30 to be running. Main power supply 30 consumes a good amount of current, and primarily runs when ignition switch 32 is on. Microprocessor 18 requires power from the main power supply 30. ASIC 12 performs switch monitoring function powered from Vstby 14. Vstby 14 is a low current supply.

Worst power (current) draw from feature when ignition switch 32 is off $$I_T = CURRENT\ DRAW\ FROM\ BATTERY = \frac{V_{PROTECTED\ DIRECT\ BATTERY}}{R_2} + I_{STBY}$$

Iatby is comprised of ASIC current drain plus amount consumed by keep alive RAM.

$$\text{Power}=V_{BAT}\times I_T$$

Shutdown Timer/Natural Vapor Leak Detect Circuits

Figure 2:
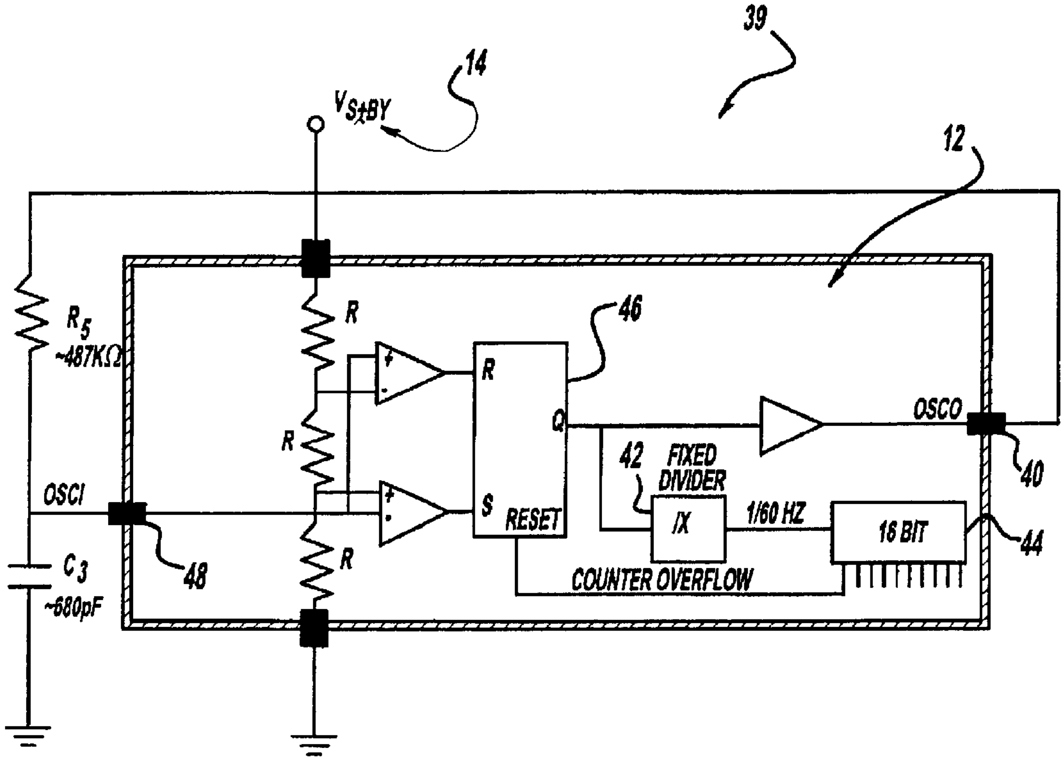
FIG. 2 is a diagram of a shut-down timer circuit according to the preferred embodiment of the present invention.

In FIG. 2, a time-based/switch monitoring circuit 39 is illustrated.

For minimum frequency error, the external components were selected to have tight tolerance and low thermal drift. (R=487K, 1%, 100 ppm/° C.) (C=680 pf, 5%, 30 ppm/° C.). The frequency of oscillation is $$f = \frac{1}{2RCln2}.$$

In this application, f=2.1 KHz. Selecting a large value for R and small for C reduces the current required from the OSCO pin 40 (and therefore from $V_{STBY}$). On the other hand, a larger RC time constant reduces the frequency and thus power consumption. The RC oscillator topology is similar to the classic '555 circuit (not shown), except that a separate discharge transistor is not used to discharge the timing capacitor.

The resistor ladder with matched resistors 'r' establishes the switch points of the oscillator circuit 39 at ⅓ and ⅔ of $V_{STBY}$ and removes any contribution of $V_{STBY}$ to the oscillator frequency. The oscillator output is divided by a fixed divider 42 (in this case by $2^{17}$) to produce a 1/60 Hz (i.e. 1 minute period) signal. The 16-bit counter 44 counts the number of minutes since the oscillator circuit 39 was started. The control logic block monitors the NVLD switch input (not shown). When the NVLD switch (not shown) goes low, the counter value is stored to an ASIC register NSCT and maintained by the standby supply such that software can read the value at the next powerup. Another ASIC register, NSCIP (not shown), establishes an ignore period for the switch. During the first NSCIP minutes, the switch position is ignored. The oscillator is kept running for a minimum of 1024 minutes (14 hrs.) regardless of the NVLD switch (not shown), to keep track of engine off time during this period for other software functions which require this information. The 16-bit counter value is available to the microprocessor 18 in another ASIC register KOT (not shown).

After 1024 minutes have passed and the monitored switch has closed, the oscillator circuit 39 is stopped by asserting reset on the RS flip flop 46. This cuts $I_{OD}$ to ASIC 12 from 150 μA with the oscillator running to a maximum of 40 μA with it stopped. The resistor ladder is connected across the standby supply at all times. In order to minimize $I_{STBY}$ current, r is as large as practical without consuming excessive silicon area.

The oscillator circuit 39 may be stopped or started by the microprocessor 18. The oscillator circuit 39 frequency can be measured by comparing the KOT register (not shown) to a more accurate timer (not shown) in the microprocessor (the RC oscillator is accurate to +/−10% across temperature and tolerances on passive components). By doing so, software can adjust the KOT and NSCT values that are read at power up and improve the overall system accuracy.

The time base for this circuitry shall be provided by an on-chip, two pin, RC oscillator circuit 39 with an approximate period of 460 uS. This circuit shall have two pads, OSCI 48 and OSCO 40, respectively for its input and output. Extremal R and C components shall set the oscillation frequency. The frequency of oscillation shall be determined by the relationship frequency=1/(2 RC In2). The oscillator output shall be held low when the oscillator is disabled.

The oscillator circuit 39 shall not be affected by RESET, therefore the oscillator may come up in the on or off state when power is first applied to the device. If on, it can then transition to the off state at any time between one oscillator clock and the maximum timeout (approximately 45.5 days).

Only the microprocessor 18 shall be able to start the oscillator circuit 39. Either the microprocessor 18 or the ASIC 12 state machine shall be able to stop the oscillator 39. The microprocessor 18 shall control the start/stop operations through writes to the OC bit (not shown) in the STSC register (synchronous to the system clock) (not shown). The state machine can only reset this bit (synchronous to the oscillator clock). Starting the oscillator circuit 39 shall have the effect of resetting the states of the KOT, NSCT, and STPR registers. Stopping the oscillator circuit 39 shall have the effect of holding the states of the registers.

The microprocessor 18 can enable/disable the oscillator circuit 39 at any time, which shall start or stop the ASIC 12 state machine. However, the oscillator clock is asynchronous to the main system clock. The oscillator circuit 39 shall be disabled by clearing the OC bit in the STSC register. Software shall wait for the OS bit (not shown) to be cleared before reading or writing to any other registers in this block.

Immediately following the time that the oscillator circuit 39 is enabled by the microprocessor 18 the KOT, NSCT, and STPR registers shall be cleared and the prescaler (not shown) and counter shall begin counting. The oscillator circuit 39 shall then run for a minimum of 1024 minutes unless the microprocessor 18 disables it prior to this. The operation of the oscillator circuit 39 shall be controlled by one of the four cases below:

Case 1: The NSCIP register is programmed to HFFFF. The NVLDSW pin 34 shall not be monitored and the NSCT register shall not be updated form its recently cleared state, In this case, the counter shall run for 1024 minutes and then the state machine shall disable the oscillator, or the counter shall run until the microprocessor disables it, whichever comes first In either case, the KOT and STPR registers shall be latched at their final values at the time the oscillator is disabled. They shall remain latched until the next time that the microprocessor enables the oscillator.

Case 2: The NSCIP register is programmed to a value less than HFFFF and the NVLDSW is low as the NSCIP value is reached by the counter. The current count value (equal to the programmed NSCIP value) shall immediately be latched into the NSCT register. The counter shall continue until 1024 minutes is reached, then the state machine shall disable the oscillator. If 1024 minutes has already been reached, the oscillator shall be immediately disabled. The KOT, STPR, and NSCT registers shall be latched at their final values at the time the oscillator is disabled. They shall be latched until the next time that the microprocessor enables the oscillator.

Case 3: The NSCIP register is programmed to a value less than HFFFF and the NVLDSW pin is high as the NSCIP value is reached by the counter. The counter shall continue until the NVLDSW pin transitions to the low state and the counter reaches 1024 minutes. After both these two conditions are met, in either order, the state machine shall disable the oscillator. The KOT, STPR, and NSCT registers shall be latched at their final values at the time the oscillator is disabled. They shall be latched until the next time that the microprocessor enables the oscillator.

Case 4: The NSCIP register is programmed to a value less than HFFFF and the NVLDSW pin is high as the NSCIP value is reached by the counter. If no NVLDSW pin transition is ever observed (a low state must be sampled by a rising edge of the oscillator clock), the counter shall continue until the value of 65595 minutes is reached. At this time, the state machine shall disable the oscillator. The KOT, STPR, and NSCT registers shall be latched at their final values at the time the oscillator is disabled. They shall be latched until the next time that the microprocessor enables the oscillator.

Shut-Down Timer/NVLD Registers

The shutdown timer shall consist of a 17 bit prescaler 42, a 16 bit counter 44, and the KOT, NSCIP, NSCT, and STPR registers. The KOT register shall always reflect the live state of the 16 bit counter 44 while the STPR register shall always reflect the live state of the most significant 16 bits of the 17 bit prescaler.

The prescaler 42 shall output a nominal 1/60 Hz waveform which shall be used as the input clock to the counter 44. [The accuracy of the measured shutdown time can be increased in software by calibrating the system while the module is running. Either the prescaler and/or the counter 44 can be read and compared to the value of a timer in the microprocessor over a common interval of time. This information can then be used by the microprocessor on subsequent system power up as a calibration constant to scale the shutdown timer count].

The NSCIP register shall hold the programmed ignore period value. This value shall be the period of time that the NVLD pin will not be monitored for a low state after the oscillator circuit 39 is enabled. It shall only be loaded/modified when the oscillator circuit 39 is disabled. Subsequent to this ignore period (the NSCIP value), the first low state that is detected shall cause the switch closure time to be latched into the NSCT register. Other transitions on this pin shall be ignored.

RELEVANT ASIC REGISTERS

Key Off Time Register — KOT RO HBEO D3040

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Time since Key Off (oscillator clocks/131072) | | | | | | | | | | | | | | | |

Not affected by reset — RO = read only

The live counter value shall be stored in the KOT register. The value in this register shall represent the time elapsed, in minutes, since the OC bit in the STSC register was written from a zero to a one. This register shall be cleared by the hardware after a one is written to the OC bit in the STSC register (after a delay of 2 oscillator clocks—approximately 920 uS)). [Since the oscillator clock and the system clock are not synchronized, the oscillator circuit 39 should be disabled before reading this register]. KOT shall not be affected by reset since this circuit must operate during reset.

Shutdown Timer Prescaler Register — STPR RO

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Time since Key Off (oscillator clocks/2) | | | | | | | | | | | | | | | |

Not affected by reset

The STP register shall store the most significant 16 bits of the 17 bit prescaler 42 and thus shows the time elapsed, in oscillator clocks divided by two, since the OC bit in the STSC register was written from a zero to a one This register shall be cleared by the hardware aft a one is written to the OC bit in the STSC register (after a delay of two oscillator clocks—approximately 92 uS). [Since the oscillator clock and the system clock are not synchronized, the oscillator circuit 39 should be disabled before reading this register]. STP shall not be affected by reset since this circuit must operate during reset.

NVLD Switch Closure Ignore Period Register — NSCIP R/W HBE4 D3044

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Ignore Period (minutes) | | | | | | | | | | | | | | | |

Not affected by reset — RW = read/write

NSCIP shall store the period of time, in minutes, that the NVLDSW pin state will be ignored (no updates to NSCT register allowed), starting form the time that the OC bit in the STSC register is written from zero to one. If this register is written to FFFF, then the NVLDSW pin monitoring functionality shall be disabled. NSCIP shall not be affected by reset since this circuit must operate during reset.

NVLD Switch Closure Time Register — NSCT RO HBE6 D3046

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Time of Switch Closure (minutes) | | | | | | | | | | | | | | | |

Not affected by reset

The NSCT register shall store the time, in minutes, that the NVLDSW pin state transitioned, from high to low, starting from the time that the OC bit in the STSC register is written form a zero to a one. This register shall be cleared by writing the OC bit in the STSC register to a one. These bits shall be loaded on the rising edge of the oscillator clock, following a transition of the NVLDSW pin from high to allow, after the ignore period (count greater than/equal to the NSCIP register value) has elapsed. Alternatively, if the NVLDSW pin is low as the ignore period is reached, the ignore period value shall be loaded into this register. However, if the NSCIP register is set to FFFF, this register shall not be loaded, but shall still be cleared by writing the OC bit in the STSC register form a zero to a one. [Since the oscillator clock and the system clock are not synchronized, the oscillator 20 should be disabled before reading this register]. NSCT shall not be affected by reset since this circuit must operate during reset.

Shutdown Timer Status/Control Register STSC R/W HBE8 D3048

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | OS | OC | NVLDSW |
| 0 | 0 | 0 | 0 | 0 | 0 | 0 | 0 | 0 | 0 | 0 | 0 | 0 | X | X | PS |

PS = pin state

OS—Oscillator Status. This bit shall be set by the hardware after a one is written to the OC bit. This bit shall be cleared two oscillator clock periods after the OC bit is written to a zero, or when the shutdown timer circuitry has met its criteria for termination. OS shall not be affected by reset.

OC—Oscillator Control. This bit shall provide microprocessor control for starting and stopping the shutdown timer/NVLD functions. Writing a one to this bit shall enable the oscillator, clear the prescaler, counter, and the NSCT registers, and start the shutdown timer counting. Writing a zero to this bit shall stop the oscillator, which shall freeze both the prescaler and the counter and reset the OS bit register (after a delay of 2 oscillator clocks—approximately 920uS). After this, no further updates to the NSCT register shall occur until OC is written back to a one which begins the sequence over again. OC shall be cleared by the state machine upon reaching the criteria for termination. The OC bit shall be unaffected by reset.

NVLDSW—NVLDSW pin state. The state of the NVLDSW pin shall be stored in this bit. It shall not be latched during a read. The contents of the NVLDSW bit shall not be affected by reset.

It is to be understood that the invention is not limited to the exact construction illustrated and described above, but that various changes and modification may be made without departing from the spirit and scope of the invention.

We claim:

1. An apparatus for measuring closure time of an external switch in a vehicle when a vehicular ignition switch is off, said apparatus comprising:

an application specific integrated circuit having a counter for counting a vehicle shutdown time while the ignition switch is off and an input for capturing a closure time of the external switch;

an oscillator connected to said application specific integrated circuit, the oscillator providing a reference signal that is used as a clock source to said counter;

a low power stand-by voltage source for providing power to said application specific integrated circuit while the ignition switch is off; and external interface circuitry electrically connected between the external switch and said input of said application specific integrated circuit, the external interface circuitry providing a cleansing current for the external switch while the ignition switch is on.

2. The apparatus of claim 1, wherein said low power stand-by voltage source includes a circuit design which uses an existing battery in said vehicle.

3. The apparatus of claim 2, wherein the cleansing current originates from the existing vehicle battery, the current passing through a small signal diode, a first resistor, and the external switch during an ignition ON state and through a second resistor and the external switch during an ignition OFF state.

4. The apparatus of claim 2 wherein said application specific integrated circuit captures said switch closure time such that a microprocessor can obtain said switch closure time when the vehicular ignition switch is on.

5. A method for measuring an amount of time needed for a switch closure, in a vehicle having a battery, when a vehicle ignition switch is off, said method comprising the steps of:

providing an application specific integrated circuit with a low current draw, thus preventing excessive drain of the battery in the vehicle, the application specific integrated circuit further comprising an oscillator that provides a time base for determining vehicular shutdown time;

providing a low powered stand-by voltage source for providing power to said application specific integrated circuit after the vehicle ignition is switched off; and providing interface circuitry which interfaces said application specific integrated circuit to the switch being monitored for an amount of time needed for closure while the vehicle ignition switch is off.

6. The method as defined in claim 5, wherein said step of providing said external interface circuitry includes the step of providing a third interface to said vehicle main power supply.

7. The method as defined in claim 5, wherein said switch being monitored for an amount of time needed for closure includes a pressure switch.

* * * * *